(12) United States Patent
Seki et al.

(10) Patent No.: US 11,532,162 B2
(45) Date of Patent: Dec. 20, 2022

(54) INFORMATION PRESENTING DEVICE AND INFORMATION PRESENTING METHOD

(71) Applicant: Komatsu Ltd., Tokyo (JP)

(72) Inventors: Masanobu Seki, Tokyo (JP); Shunsuke Miyamoto, Tokyo (JP); Kaoru Yasuda, Tokyo (JP)

(73) Assignee: Komatsu Ltd., Tokyo (JP)

( * ) Notice: Subject to any disclaimer, the term of this patent is extended or adjusted under 35 U.S.C. 154(b) by 236 days.

(21) Appl. No.: 16/956,691

(22) PCT Filed: Feb. 19, 2019

(86) PCT No.: PCT/JP2019/006122
§ 371 (c)(1),
(2) Date: Jun. 22, 2020

(87) PCT Pub. No.: WO2019/167726
PCT Pub. Date: Sep. 6, 2019

(65) Prior Publication Data
US 2020/0327336 A1    Oct. 15, 2020

(30) Foreign Application Priority Data
Feb. 28, 2018    (JP) .............................. JP2018-035382

(51) Int. Cl.
*G06V 20/52*    (2022.01)
*G08G 1/00*    (2006.01)
*G06V 20/54*    (2022.01)

(52) U.S. Cl.
CPC .............. *G06V 20/52* (2022.01); *G06V 20/54* (2022.01); *G08G 1/205* (2013.01); *G08G 1/207* (2013.01); *G06V 2201/08* (2022.01)

(58) Field of Classification Search
CPC ...... G06V 20/54; G06V 10/255; G06V 20/52; G06V 20/56; G06V 20/58; G06V 2201/08;
(Continued)

(56) References Cited

U.S. PATENT DOCUMENTS 6,246,932 B1 *  6/2001  Kageyama ........... G05D 1/0297
                                                           701/50
11,244,171 B2 *  2/2022  Wu ........................ H04N 7/183
(Continued)

FOREIGN PATENT DOCUMENTS

AU    2014213529 A1 *  3/2015 ............... B60R 1/00
CA       2815822 A1 * 11/2013 ............... B60R 1/00
(Continued)

OTHER PUBLICATIONS

Maintaining the Identity of Multiple Vehicles as They Travel Through a Video Network (Year: 2001).*
(Continued)

*Primary Examiner* — Nizar N Sivji
(74) *Attorney, Agent, or Firm* — Locke Lord LLP

(57) ABSTRACT

A vehicle recognition unit of an information presenting device specifies a position of each of a plurality of vehicles, based on images captured by a plurality of imaging devices installed at a construction site. A vehicle designating unit receives designation of a designated vehicle, among the plurality of specified vehicles. A display control unit outputs a signal for displaying in an overlapping manner a proximity plot representing a position of another vehicle whose distance from the designated vehicle is less than a threshold on an overhead image of the construction site.

9 Claims, 11 Drawing Sheets

(58) Field of Classification Search
CPC . E02F 9/2087; E02F 9/26; H04N 7/18; G08G 1/205; G08G 1/207; G08G 1/137; G08G 1/167

See application file for complete search history.

(56) References Cited

U.S. PATENT DOCUMENTS

| | | | | |
|---|---|---|---|---|
| 2015/0081212 A1* | 3/2015 | Mitchell | ............... | H04W 4/022 |
| | | | | 701/454 |
| 2015/0217690 A1* | 8/2015 | Mitsuta | ................ | G06T 3/4038 |
| | | | | 348/148 |
| 2021/0279451 A1* | 9/2021 | Nerayoff | ................ | G08G 1/056 |

FOREIGN PATENT DOCUMENTS

| | | | | | | |
|---|---|---|---|---|---|---|
| CA | | 2941999 C | * | 7/2019 | ............ | G01C 21/20 |
| CA | | 2945922 C | * | 5/2020 | ............ | B60K 31/04 |
| EP | | 1643040 A2 | * | 4/2006 | ............ | E02F 9/2054 |
| EP | | 1447481 B1 | * | 3/2007 | ............ | E02F 9/2054 |
| JP | | 2003-333590 A | | 11/2003 | | |
| JP | | 2003333590 A | * | 11/2003 | | |
| JP | | 2012-203677 A | | 10/2012 | | |
| JP | | 2012203677 A | * | 10/2012 | | |
| JP | | 2014-089491 A | | 5/2014 | | |
| JP | | 2014089491 A | * | 5/2014 | | |

OTHER PUBLICATIONS

Automation in Construction (Year: 2015).*
A comprehensive survey on vehicular Ad Hoc network (Year: 2013).*

* cited by examiner

INFORMATION PRESENTING DEVICE AND INFORMATION PRESENTING METHOD

TECHNICAL FIELD

The present invention relates to an information presenting device and an information presenting method.

Priority is claimed on Japanese Patent Application No. 2018-035382, filed on Feb. 28, 2018, the content of which is incorporated herein by reference.

BACKGROUND ART

There is a plurality of vehicles such as loading vehicles and transport vehicles at the construction site. Operators of the vehicles need to carefully observe the construction site and perform work while considering safety. PTL 1 discloses a technique for setting target areas by detecting the outlines of construction machines and workers from an image captured by a camera that captures a work area and notifying a fact that the target areas contact each other when the contact occurs.

CITATION LIST

Patent Literature

[PTL 1] Japanese Unexamined Patent Application, First Publication No. 2012-203677

DISCLOSURE OF INVENTION

Technical Problem

Since there are buildings and fences at the construction site, there are many blind spots for operators of vehicles. Since other vehicles may exist in the blind spot, the operators need to work while considering that other vehicles may appear from the blind spot.

An object of the present invention is to provide an information presenting device and an information presenting method which can make operators of vehicles easily recognize other vehicles present in the vicinity.

Solution to Problem

According to an aspect of the present invention, an information presenting device includes a vehicle recognition unit that is configured to specify a position of each of a plurality of vehicles, based on images captured by a plurality of imaging devices installed at a construction site; a vehicle designating unit that receives designation of a designated vehicle, among the plurality of specified vehicles; and a display control unit that is configured to output a signal for displaying in an overlapping manner a proximity plot representing a position of another vehicle whose distance from the designated vehicle is less than a threshold on an overhead image of the construction site.

Advantageous Effects of Invention

According to the above aspect, the information presenting device can make the operator of a vehicle easily recognize other vehicles present in the vicinity.

BEST MODE FOR CARRYING OUT THE INVENTION

First Embodiment

<<Construction Site Management System>>

Figure 1:
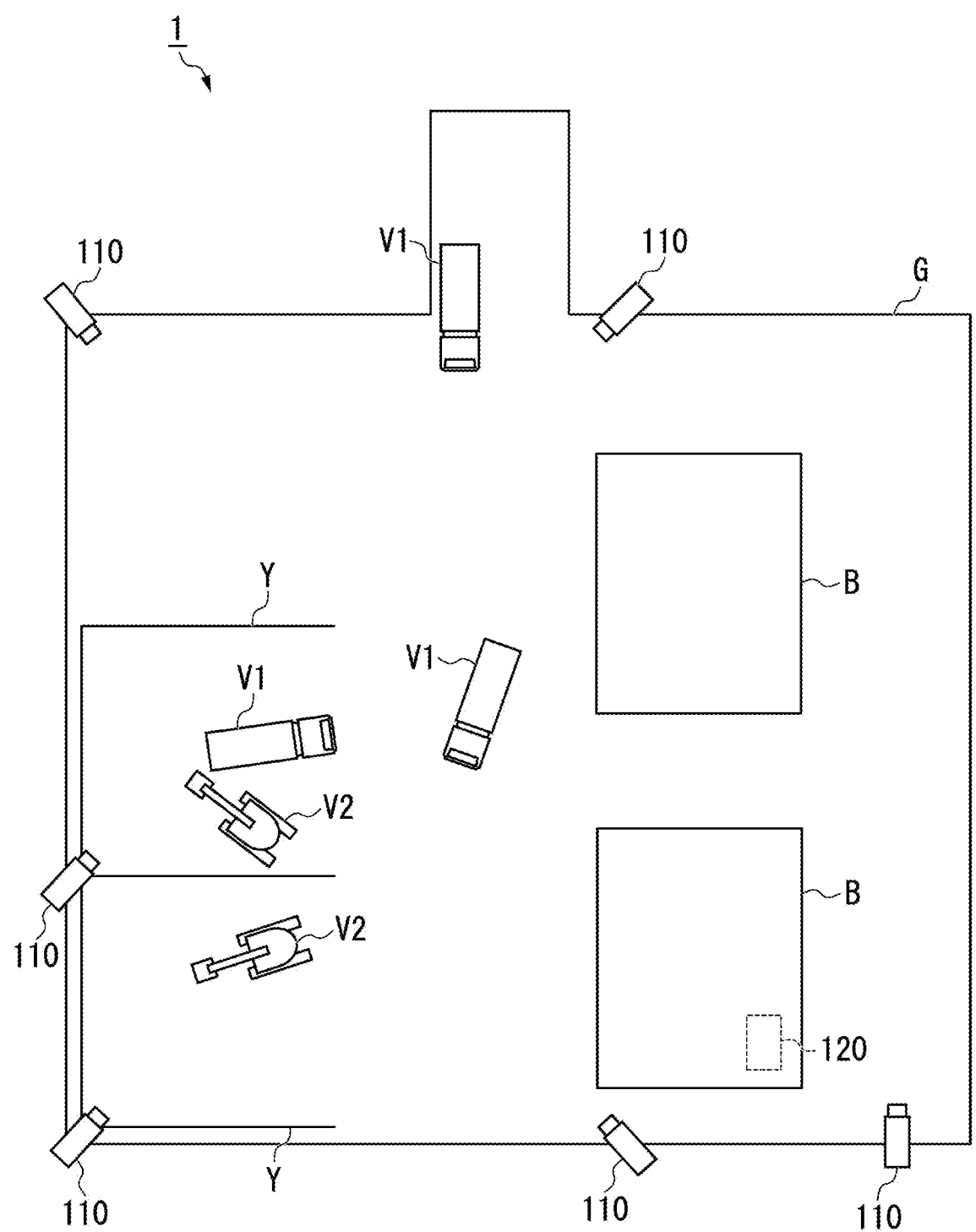
FIG. 1 is a schematic diagram showing a configuration of a construction site management system according to a first embodiment.

FIG. 1 is a schematic diagram showing a configuration of a construction site management system according to a first embodiment.

The construction site management system 1 is a system for alerting the operator of the loading vehicle V2 by presenting the position of the nearby transport vehicle V1 to the in-vehicle terminal V203 (display device) of the loading vehicle V2 traveling on the construction site G. The loading vehicle V2 and the transport vehicle V1 are examples of vehicles. The construction site management system 1 includes a plurality of imaging devices 110 and an information presenting device 120.

The plurality of imaging devices 110 are respectively installed above the construction site G and image an overhead view of the construction site G. The plurality of imaging devices 110 are provided such that all points where the manned driving vehicle can travel in the construction site G are imaged by at least one imaging device 110 without exception.

The information presenting device 120 generates an overall overhead image in which the entire construction site G is captured, based on images captured by the plurality of imaging devices 110. Further, the information presenting device 120 displays the overall overhead image on which the transport vehicle V1 is drawn, on the in-vehicle terminal V203 of the loading vehicle V2. The information presenting device 120 is provided in the building B of the construction site G, for example.

The construction site G shown in FIG. 1 is provided with two buildings B and two stockyards Y. The stockyard Y is a space for temporarily storing the earth generated by the construction work for reuse. In addition, in other embodiments, the structure of the construction site G is not restricted to the structure shown in FIG. 1. That is, the presence or absence and the number of buildings B and stockyards Y are not limited to those shown in FIG. 1.

<<Loading Vehicle>>

The loading vehicle V2 is a vehicle that operates at a site where earth is loaded, and performs embankment work or excavation work. Examples of the loading vehicle V2 include a hydraulic excavator, a bulldozer, and a wheel loader.

Figure 2:
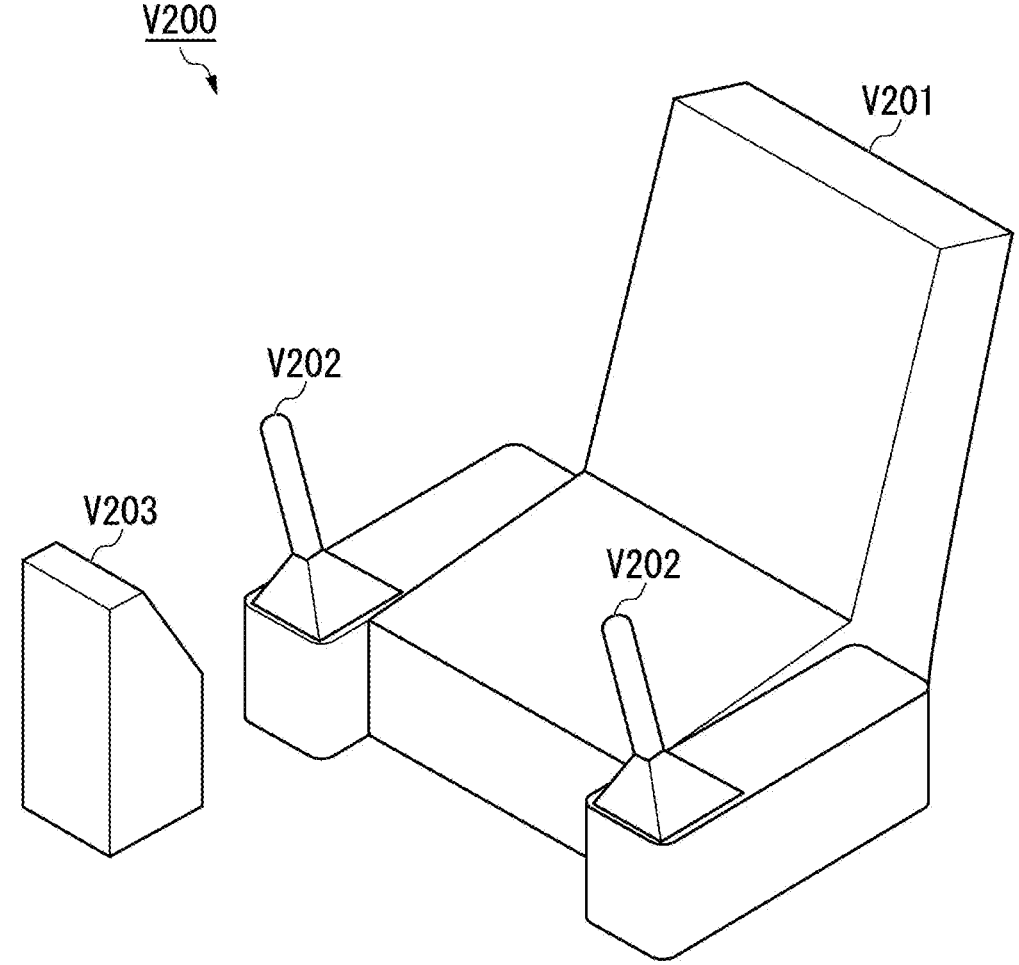
FIG. 2 is a perspective view showing the configuration of the inside of a cab of a loading vehicle.

FIG. 2 is a perspective view showing the configuration of the inside of the cab of the loading vehicle.

The loading vehicle V2 includes a cab V200. Inside the cab V200, an operator's seat V201 for an operator to sit, an operation device V202 for operating the loading vehicle V2, and an in-vehicle terminal V203 for displaying information related to work are provided.

The operation device V202 generates operation signals for the operation of the work equipment, the turning operation, and the traveling operation of the loading vehicle V2 according to the operation of the operator. The in-vehicle terminal V203 is provided between the windshield of the cab V200 and the operator's seat V201. In addition, the position of the in-vehicle terminal V203 is not limited to the position shown in FIG. 2.

<<Information Presenting Device>>

Figure 3:
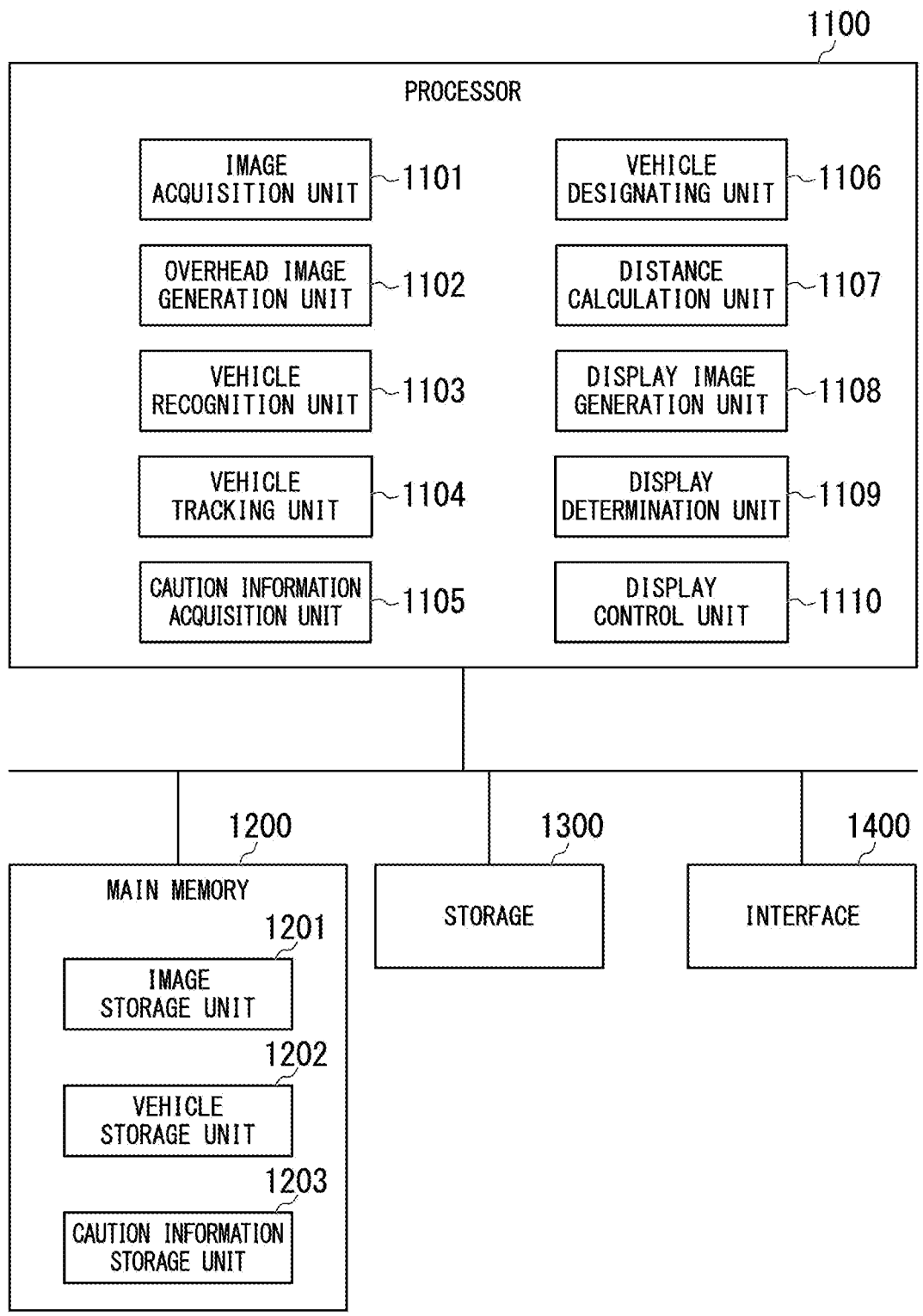
FIG. 3 is a schematic block diagram showing a configuration of an information presenting device according to the first embodiment.

FIG. 3 is a schematic block diagram showing a configuration of an information presenting device according to a first embodiment.

The information presenting device 120 is a computer including a processor 1100, a main memory 1200, a storage 1300, and an interface 1400. The storage 1300 stores a program. The processor 1100 reads the program from the storage 1300, loads it in the main memory 1200, and executes the processing according to the program.

Examples of the storage 1300 include a HDD, an SSD, a magnetic disk, a magneto-optical disk, a CD-ROM, and a DVD-ROM. The storage 1300 may be an internal medium directly connected to the common communication line of the information presenting device 120 or an external medium connected to the information presenting device 120 through the interface 1400. The storage 1300 is a tangible storage medium that is not temporary.

By executing a program, the processor 1100 includes an image acquisition unit 1101, an overhead image generation unit 1102, a vehicle recognition unit 1103, a vehicle tracking unit 1104, a caution information acquisition unit 1105, a vehicle designating unit 1106, a distance calculation unit 1107, a display image generation unit 1108, a display determination unit 1109, and a display control unit 1110.

Further, the processor 1100 reserves storage areas of the image storage unit 1201 and the vehicle storage unit 1202 in the main memory 1200 by executing the program.

The image acquisition unit 1101 acquires images from each of the plurality of imaging devices 110 at each predetermined time.

The overhead image generation unit 1102 deforms and combines a plurality of images acquired by the image acquisition unit 1101, thereby generating an overall overhead image showing the entire construction site G. The overhead image generation unit 1102 stores in advance the deformation parameters of the image captured by the imaging device 110 for each imaging device 110. The deformation parameters of the image can be specified based on the installation position and the line-of-sight direction of the imaging device 110. In addition, the method for generating the overhead image is not limited to this. For example, the overhead image generation unit 1102 according to another embodiment may generate a three-dimensional image of the construction site G by performing triangulation on the plurality of images acquired by the image acquisition unit 1101, and generate overall overhead image based on the acquired three-dimensional image.

The vehicle recognition unit 1103 extracts a location where the vehicle is captured, from the overall overhead image generated by the overhead image generation unit 1102. The vehicle recognition unit 1103 can extract a location where the vehicle is captured, by pattern matching based on the known feature value of a vehicle image, for example.

The vehicle tracking unit 1104 specifies coordinates where the same vehicle as the vehicle recognized in the past image is located, from the image acquired by the image acquisition unit 1101. The vehicle tracking unit 1104 can track the vehicle by, for example, searching for an image similar to a vehicle recognized in the past, from the image acquired by the image acquisition unit 1101.

The caution information acquisition unit 1105 acquires a point (caution point) on the construction site in the overhead image and the caution information on the caution point from the in-vehicle terminal V203 and stores the caution point and caution information in the caution information storage unit 1203. Examples of caution information include information indicating the presence of mud, frozen, fallen objects, pits and the like. The caution point may be indicated as a point or a surface.

The vehicle designating unit 1106 receives the designation of one vehicle from one or more vehicles recognized by the vehicle recognition unit 1103. Hereinafter, the vehicle that has been designated by the vehicle designating unit 1106 is also referred to as a designated vehicle. For example, the vehicle designating unit 1106 receives the information indicating the coordinates from the in-vehicle terminal V203 or a computer operated by the administrator and considers that the loading vehicle V2 captured in the coordinates designated in the overall overhead image or in the vicinity thereof is designated.

The distance calculation unit 1107 calculates the distance between the designated vehicle and another vehicle and the distance between the designated vehicle and the caution point. The distance calculation unit 1107 specifies the distance, based on the coordinates of the vehicle specified on the overhead image by the vehicle recognition unit 1103 or the vehicle tracking unit and the coordinates of the caution point on the overhead image acquired by the caution information acquisition unit 1105. Further, the vehicle recognition unit 1103 may calculate the coordinates and distance of the vehicle by a triangulation method using a plurality of images acquired by the image acquisition unit 1101.

The display image generation unit 1108 generates a display image to be displayed on the in-vehicle terminal V203 of the loading vehicle V2, based on the overall overhead image stored in the image storage unit 1201, the information stored in the vehicle storage unit 1202, and the information stored in the caution information storage unit 1203.

Based on the distance calculated by the distance calculation unit 1107, the display determination unit 1109 determines whether or not to highlight the nearby transport vehicle V1 or the nearby caution point for the loading vehicle V2. The display determination unit 1109 determines to highlight the transport vehicle V1, in a case where the distance between the transport vehicle V1 and the loading vehicle V2 is equal to or less than a predetermined threshold. The display determination unit 1109 determines to highlight the caution point, in a case where the distance between the caution point and the loading vehicle V2 is equal to or less than a predetermined threshold.

The display control unit 1110 transmits the display image generated by the display image generation unit 1108 to the loading vehicle V2.

The image storage unit 1201 stores the overall overhead image in time series.

The vehicle storage unit 1202 stores, for each vehicle recognized by the vehicle recognition unit 1103, identification information, a type, and a position representing the vehicle. The vehicle identification information is given every time the vehicle recognition unit 1103 recognizes a new vehicle, and is a value for identifying the vehicle in the tracking process by the vehicle tracking unit 1104. The identification information is different from actual identification information (machine number, IP address, or the like) for specifying the actual vehicle. Examples of vehicle types include the loading vehicles V2, the transport vehicles V1, and other vehicles. In a case where the vehicle is the loading vehicle V2, the vehicle storage unit 1202 further associates and stores the actual identification information of the loading vehicle V2.

The caution information storage unit 1203 stores the coordinates of the caution point acquired by the caution information acquisition unit 1105 and the caution information at the caution point.

<<Presenting Method of Display Information>>

Next, the operation of the information presenting device 120 according to the first embodiment will be described.

Figure 4:
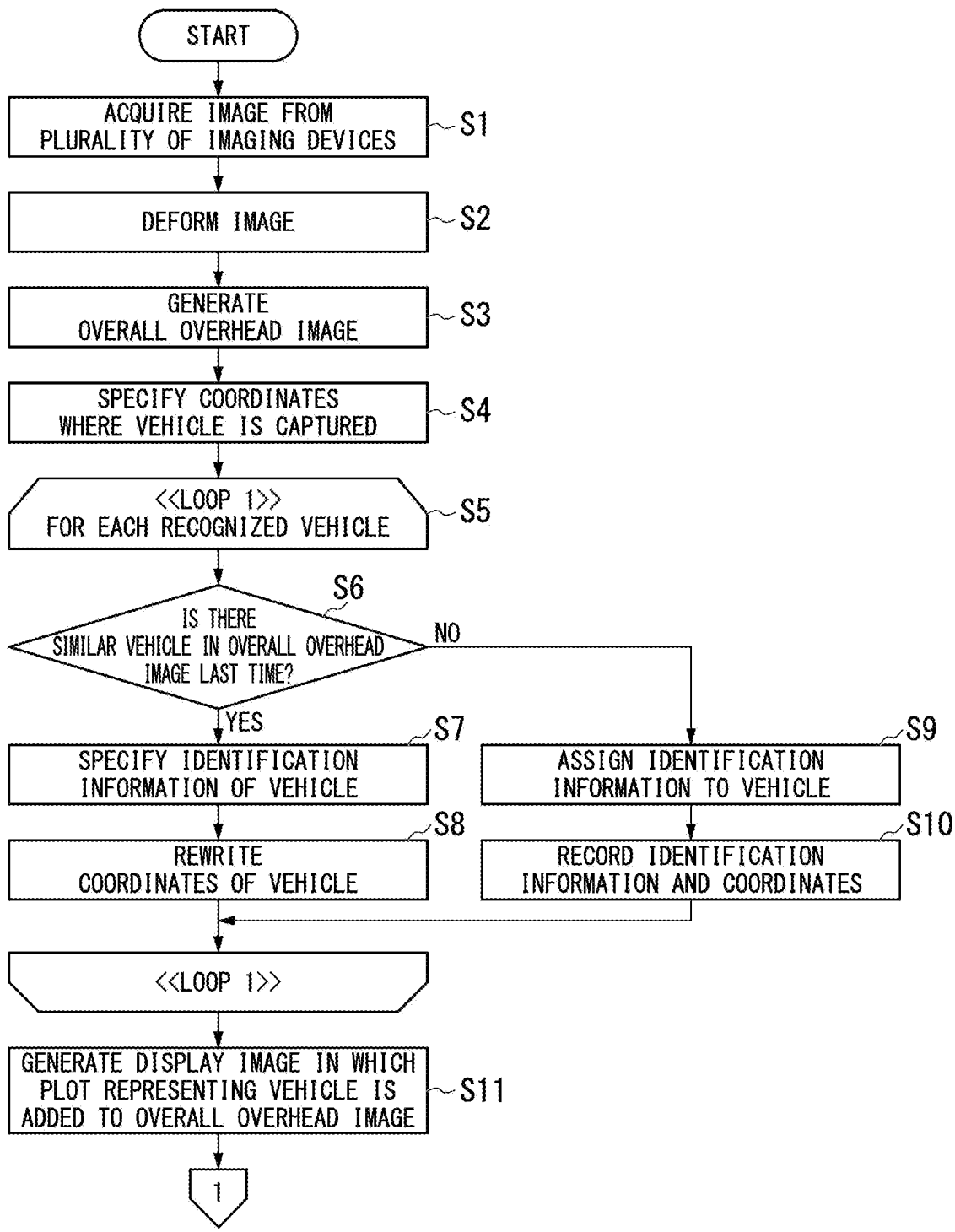
FIG. 4 is a flowchart showing a method of generating an overall overhead image by the information presenting device according to the first embodiment.
Figure 5:
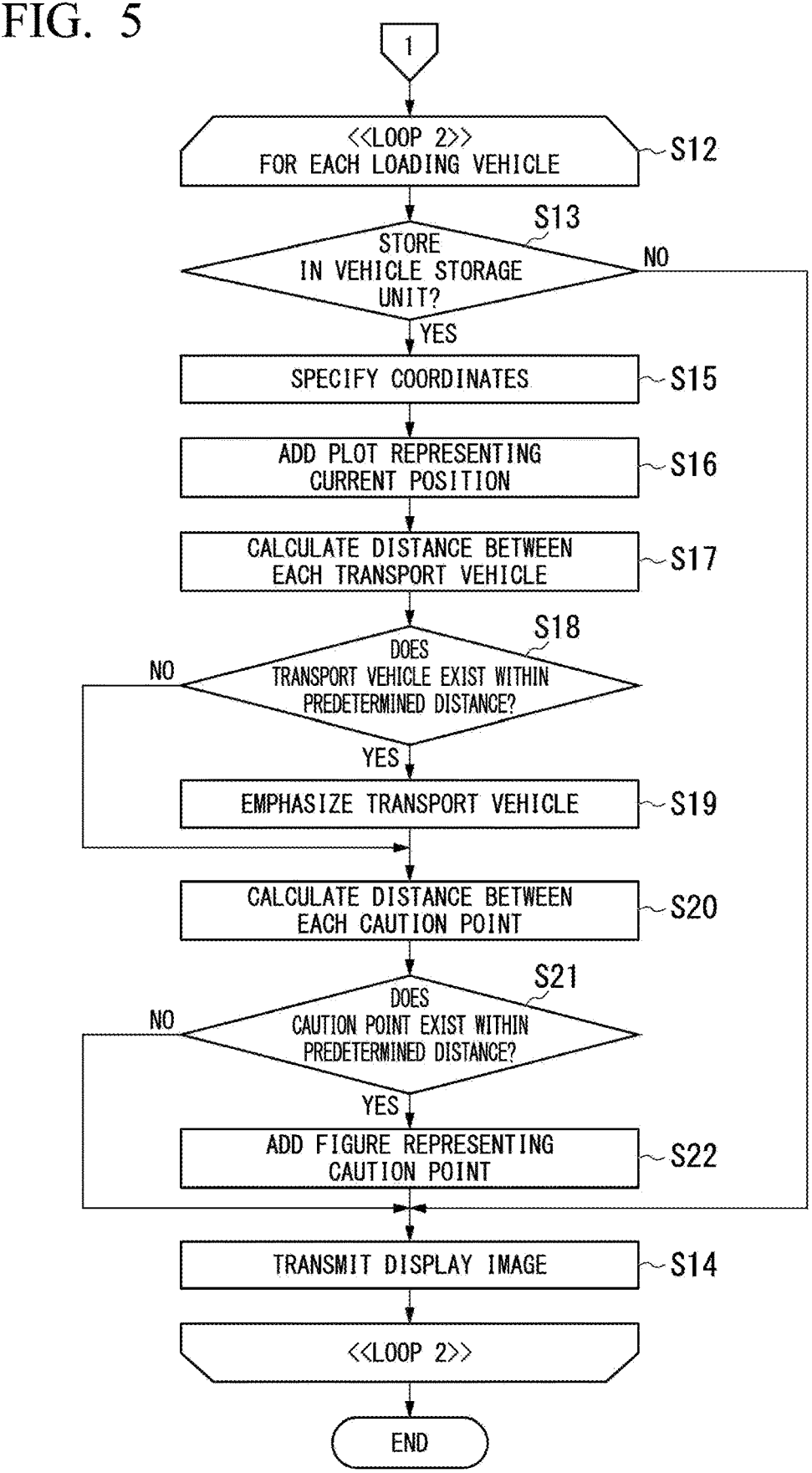
FIG. 5 is the flowchart showing the method of generating an overall overhead image by the information presenting device according to the first embodiment.

FIGS. 4 and 5 are flowcharts showing a method of generating an overall overhead image by the information presenting device according to the first embodiment.

The image acquisition unit 1101 of the information presenting device 120 acquires each image from each of the plurality of imaging devices 110 (step S1). The overhead image generation unit 1102 deforms each image acquired by the image acquisition unit 1101 using the deformation parameters corresponding to the installation position and the line-of-sight direction of the imaging device 110 (step S2). Next, the overhead image generation unit 1102 generates an overall overhead image by combining a plurality of deformed images, and stores the overall overhead image in the image storage unit 1201 (step S3). The vehicle recognition unit 1103 specifies coordinates where the loading vehicle V2 is captured and coordinates where the transport vehicle V1 is captured, from the generated overall overhead image (step S4).

The information presenting device 120 selects the vehicles recognized by the vehicle recognition unit 1103 one by one, and executes the following processing from step S6 to step S10 (step S5).

The vehicle tracking unit 1104 reads out the overall overhead image generated last time, from the image storage unit 1201, and determines whether or not a vehicle similar to the selected vehicle exists in the vicinity of the coordinates specified in step S4 (step S6). In a case where a vehicle similar to the selected vehicle exists in the vicinity of the specified coordinates (step S6: YES), the vehicle tracking unit 1104 specifies the identification information of the vehicle associated with the coordinates from the vehicle storage unit 1202 (step S7). The vehicle tracking unit 1104 rewrites the coordinates that the vehicle storage unit 1202 stores in association with the identification information to the coordinates specified in step S4 (step S8). On the other hand, in a case where a vehicle similar to the selected vehicle does not exist in the vicinity of the coordinates specified in step S4 (step S6: NO), the vehicle recognition unit 1103 assigns new identification information to the vehicle (step S9). The vehicle recognition unit 1103 associates the identification information with the coordinates specified in step S4 and records them in the vehicle storage unit 1202 (step S10).

Thus, the information presenting device 120 can update the positions of all the vehicles stored in the image storage unit 1201.

The display image generation unit 1108 generates a display image in which the normal plot P1 representing the vehicle is added to the coordinates specified in step S4 of the overall overhead image generated in step S3 (step S11). The display image generation unit 1108 may change the color and shape of the normal plot P1 depending on the type of vehicle and the like.

Next, the information presenting device 120 selects the loading vehicles V2 that exist on the construction site G one by one, and executes the following processing from step S13 to step S20 (step S12).

The display control unit 1110 determines whether there is a vehicle associated with the actual identification information of the selected loading vehicle V2 among the vehicles stored in the vehicle storage unit 1202 (step S13). That is, the display control unit 1110 determines whether or not the selected loading vehicle V2 is a designated vehicle. In a case where the vehicle associated with the actual identification information of the selected loading vehicle V2 is not stored in the vehicle storage unit 1202 (step S13: NO), the display control unit 1110 transmits the display image generated in step S11 to the selected loading vehicle V2 (step S14).

Figure 6:
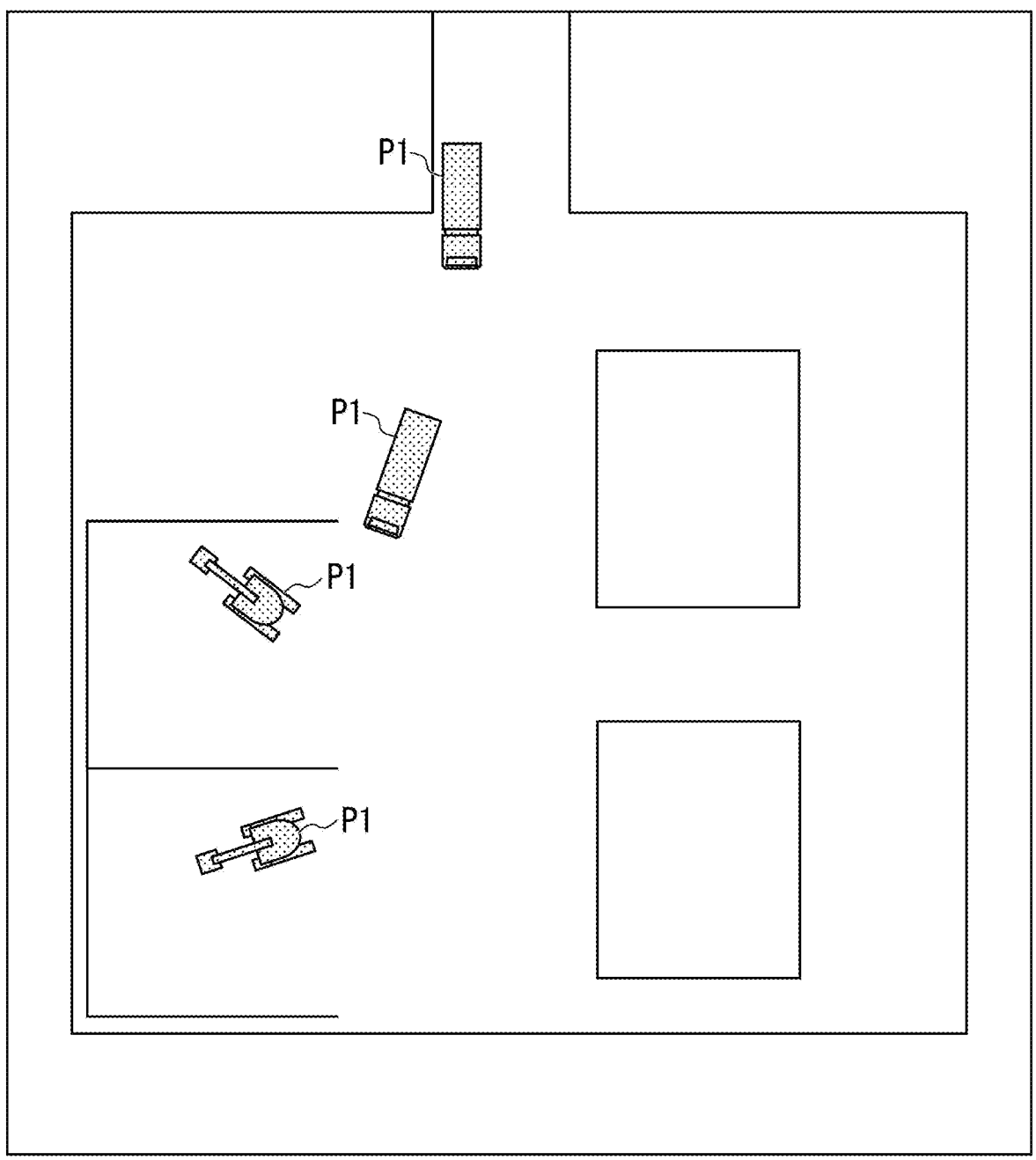
FIG. 6 is an example of an image displayed on an in-vehicle terminal that is not associated with a vehicle captured in the overall overhead image.

That is, as shown in FIG. 6, a display image including the overall overhead image and the normal plot P1 representing the vehicle is transmitted to a vehicle not associated with the vehicle captured in the overall overhead image (vehicle that is not a designated vehicle), among the loading vehicles V2 present at the construction site G. FIG. 6 is an example of an image displayed on an in-vehicle terminal that is not associated with a vehicle captured in the overall overhead image.

On the other hand, in a case where the vehicle associated with the actual identification information of the selected loading vehicle V2 is stored in the vehicle storage unit 1202 (step S13: YES), the display image generation unit 1108 specifies the coordinates stored in the vehicle storage unit 1202 in association with the actual identification information of the selected loading vehicle V2 (step S15). Next, the display image generation unit 1108 attaches a host vehicle plot P2 representing the current position to the coordinates specified in step S15 of the display image generated in step S11 (step S16). The host vehicle plot P2 differs from the normal plot P1 attached in step S11 in at least one of color and shape.

Figure 7:
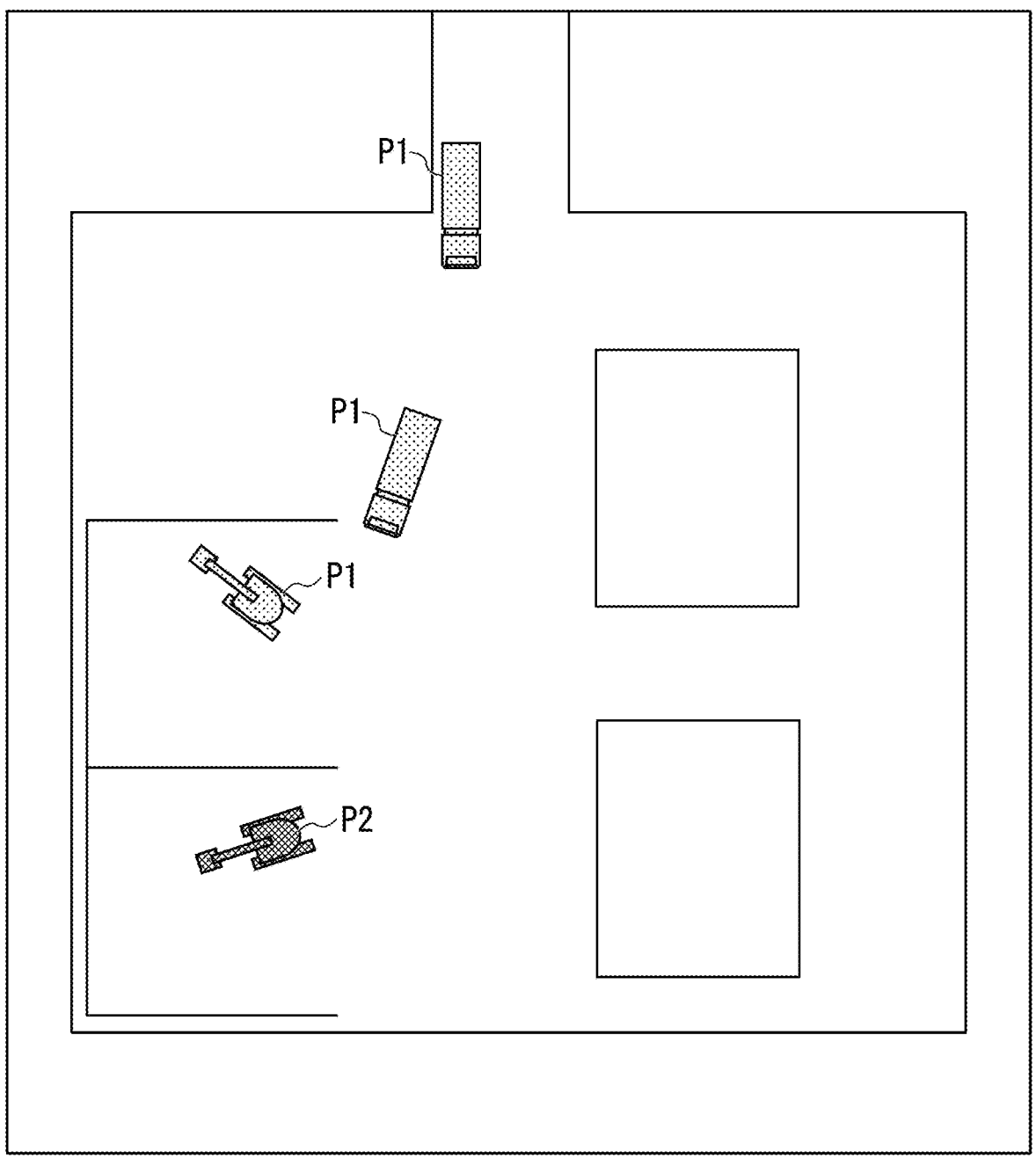
FIG. 7 is an example of an image displayed on an in-vehicle terminal of a loading vehicle in which there is no transport vehicle in the vicinity.

Thus, as shown in FIG. 7, the information presenting device 120 generates a display image including the normal plot P1 representing the overall overhead image and the vehicle, and the host vehicle plot P2 representing the current position. FIG. 7 is an example of an image displayed on an in-vehicle terminal of a loading vehicle with no transport vehicle in the vicinity. Thus, the operator of the loading vehicle V2 can easily recognize the position of the loading vehicle V2 that is on board.

Next, the distance calculation unit 1107 refers to the vehicle storage unit 1202 and calculates the distance between the coordinates specified in step S15 and the coordinates of the transport vehicle V1 (step S17).

Next, the display determination unit 1109 determines whether or not the transport vehicle V1 exists within a predetermined distance from the coordinates of the selected loading vehicle V2, based on the calculated distance (step S18). In a case where the transport vehicle V1 does not exist within the predetermined distance from the coordinates of the selected loading vehicle V2 (step S18: NO), the display determination unit 1109 determines that there is no transport vehicle V1 to be emphasized, on the in-vehicle terminal V203 of the selected loading vehicle V2.

On the other hand, in a case where the transport vehicle V1 exists within the predetermined distance from the coordinates of the selected loading vehicle V2 (step S18: YES), the display determination unit 1109 determines there is a transport vehicle V1 to be emphasized, on the in-vehicle terminal V203 of the selected loading vehicle V2. The display image generation unit 1108 replaces the normal plot P1, which is attached to the coordinates of the transport vehicle V1 whose distance from the loading vehicle V2 is less than the predetermined distance in the display image generated in step S16, with the proximity plot P3 that is a different mode from the normal plot P1 and the host vehicle plot P2 (step S19). For example, the proximity plot P3 is different from the normal plot P1 and the host vehicle plot P2 in color, shape, or outline. Thus, in the display image, the transport vehicle V1 whose distance from the loading vehicle V2 is less than the predetermined distance can be emphasized.

Figure 8:
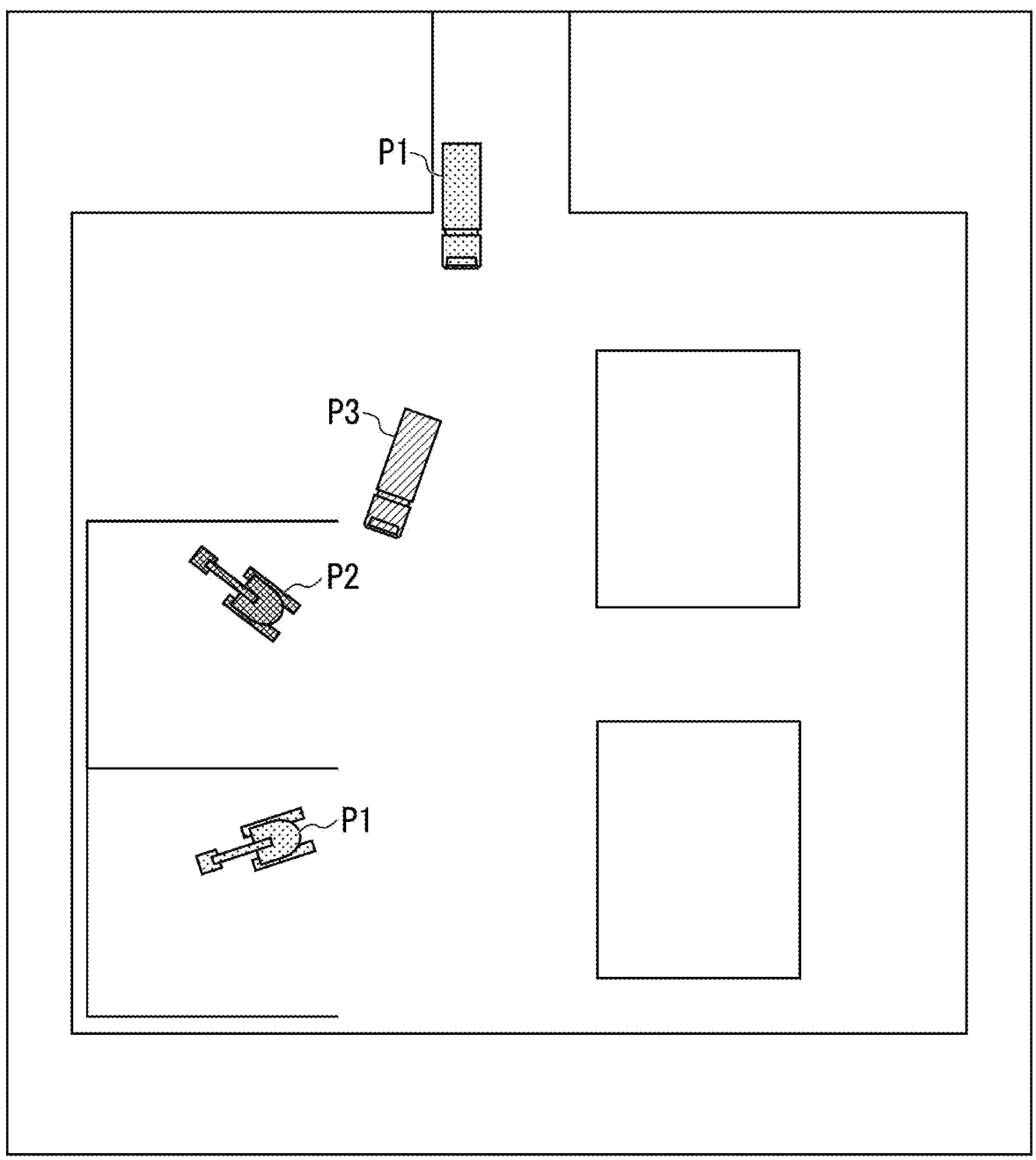
FIG. 8 is an example of an image displayed on the in-vehicle terminal of a loading vehicle in which there is a transport vehicle in the vicinity.

Thus, as shown in FIG. 8, the information presenting device 120 generates a display image including a normal plot P1 representing the overall overhead image and the vehicle, a host vehicle plot P2 representing the current position, and a proximity plot P3 highlighting the nearby transport vehicle V1. FIG. 8 is an example of an image displayed on the in-vehicle terminal of a loading vehicle with a transport vehicle in the vicinity. Thus, the operator of the loading vehicle V2 can easily recognize that the transport vehicle V1 exists in the vicinity of the loading vehicle V2 that is on board.

Next, the distance calculation unit 1107 refers to the caution information storage unit 1203 and calculates the distance between the coordinates specified in step S15 and the coordinates of the caution point (step S20).

Next, the display determination unit 1109 determines whether or not a caution point exists within a predetermined distance from the coordinates of the selected loading vehicle V2, based on the calculated distance (step S21). In a case where a caution point does not exist within the predetermined distance from the coordinates of the selected loading vehicle V2 (step S21: NO), the display determination unit 1109 determines that there is no caution information to be displayed, on the in-vehicle terminal V203 of the selected loading vehicle V2.

On the other hand, in a case where a caution point exists within the predetermined distance from the coordinates of the selected loading vehicle V2 (step S21: YES), the display determination unit 1109 determines that there is a need to display a caution information, on the in-vehicle terminal V203 of the selected loading vehicle V2. The display image generation unit 1108 attaches a figure P4 representing the shape of the caution point to the coordinates of the caution point whose distance from the loading vehicle V2 is less than the predetermined distance, in the display image generated in step S16 (step S22). Thus, the presence of a caution point whose distance from the loading vehicle V2 is less than a predetermined distance can be notified on the display image.

Figure 9:
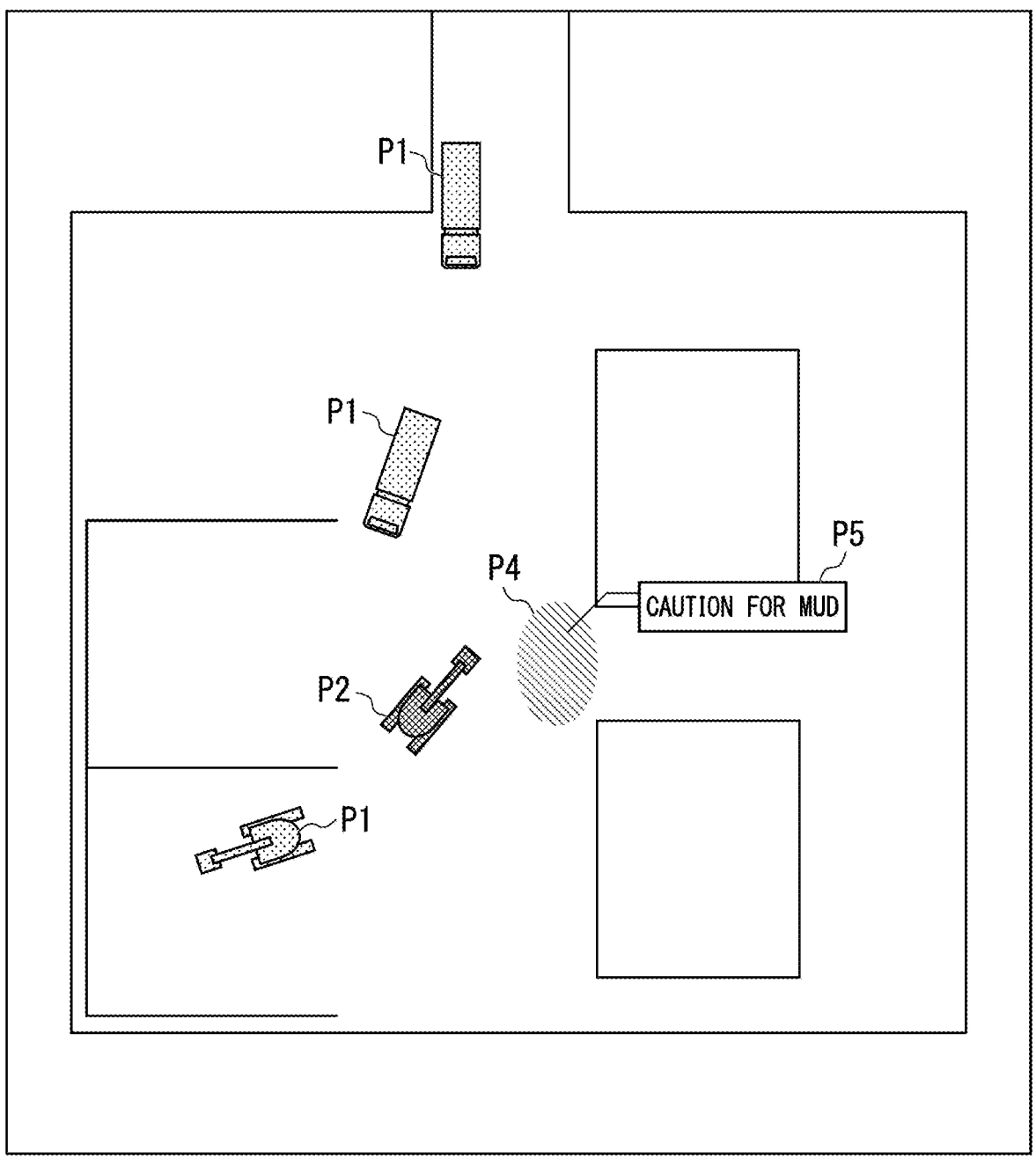
FIG. 9 is an example of an image displayed on the in-vehicle terminal of a loading vehicle with a caution point in the vicinity.

Thus, as shown in FIG. 9, the information presenting device 120 generates a display image including the normal plot P1 representing the overall overhead image and the vehicles, the host vehicle plot P2 representing the current position, the figure P4 indicating the range of the nearby caution point, and a box P5 representing caution information in the caution range indicated by the figure P4. FIG. 9 is an example of an image displayed on the in-vehicle terminal of a loading vehicle with a caution point in the vicinity. Thus, the operator of the loading vehicle V2 can easily recognize that there is a point requiring caution in the vicinity of the loading vehicle V2 that is on board.

Then, the display control unit 1110 transmits, to the loading vehicle V2, the display image generated in step S16 (FIG. 7), the display image in which the nearby transport vehicle V1 is emphasized in step S19 (FIG. 8), and the display image in which the position of the caution point is represented in step S22 (FIG. 9), or a display image in which the position of the caution point is represented by emphasizing the nearby transport vehicle V1 (step S14).

<<Designation Method of Loading Vehicle>>

Next, a method of designating the loading vehicle V2 from the overall overhead image will be described.

Figure 10:
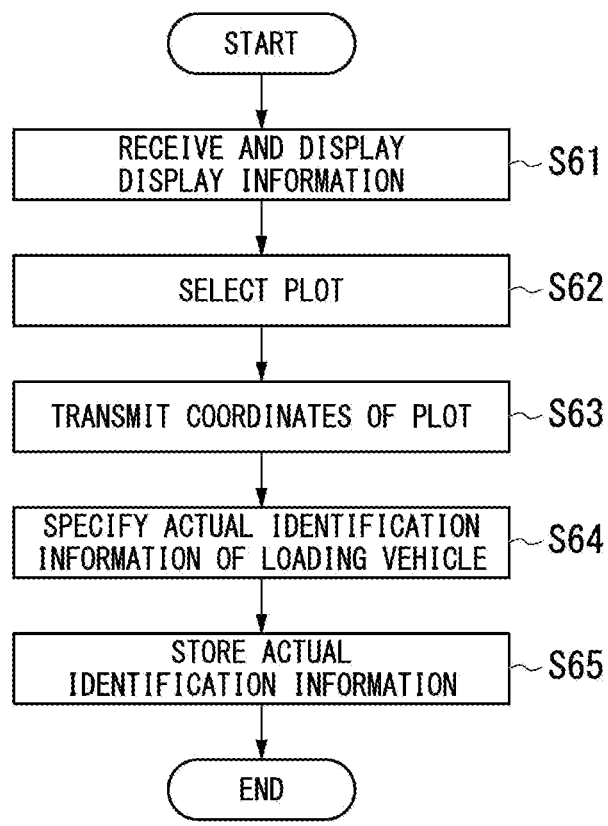
FIG. 10 is a flowchart showing a method of designating a loading vehicle in the first embodiment.

FIG. 10 is a flowchart showing a method of designating a loading vehicle in the first embodiment.

When the operator of the loading vehicle V2 activates the loading vehicle V2, the in-vehicle terminal V203 is also activated. When the in-vehicle terminal V203 is activated, it receives and displays a display image from the information presenting device 120 (step S61). Since the loading vehicle V2 that has been activated is not associated with the vehicle captured in the overall overhead image in the information presenting device 120, the display image that is displayed at this time does not include the host vehicle plot P2 representing the current position, as shown in FIG. 6.

The operator operates the in-vehicle terminal V203, searches for the loading vehicle V2 on board on the display image, and selects the normal plot P1 representing the loading vehicle V2 (step S62). The in-vehicle terminal V203 specifies the coordinates of the selected normal plot P1 and transmits the coordinates to the information presenting device 120 (step S63).

When receiving the information indicating the coordinates of the normal plot P1 from the in-vehicle terminal V203, the vehicle designating unit 1106 of the information presenting device 120 specifies the actual identification information of the loading vehicle V2 including the in-vehicle terminal V203 that is the transmission source of the information (step S64). Then, the vehicle designating unit 1106 stores the specified actual identification information in the vehicle storage unit 1202 in association with the vehicle related to the received coordinates (step S65). That is, the vehicle designating unit 1106 receives the designation of the loading vehicle V2 by receiving the information indicating the coordinates of the normal plot P1 from the in-vehicle terminal V203.

Thus, since the loading vehicle V2 captured in the overall overhead image and the actual identification information are associated with each other, a display image including the host vehicle plot P2 representing the current position is transmitted to the loading vehicle V2, as shown in FIGS. 7 to 9.

<<Registering Caution Information>>

Next, a method in which the operator of the loading vehicle V2 registers the caution information related to the caution point in the information presenting device 120 will be described.

Figure 11:
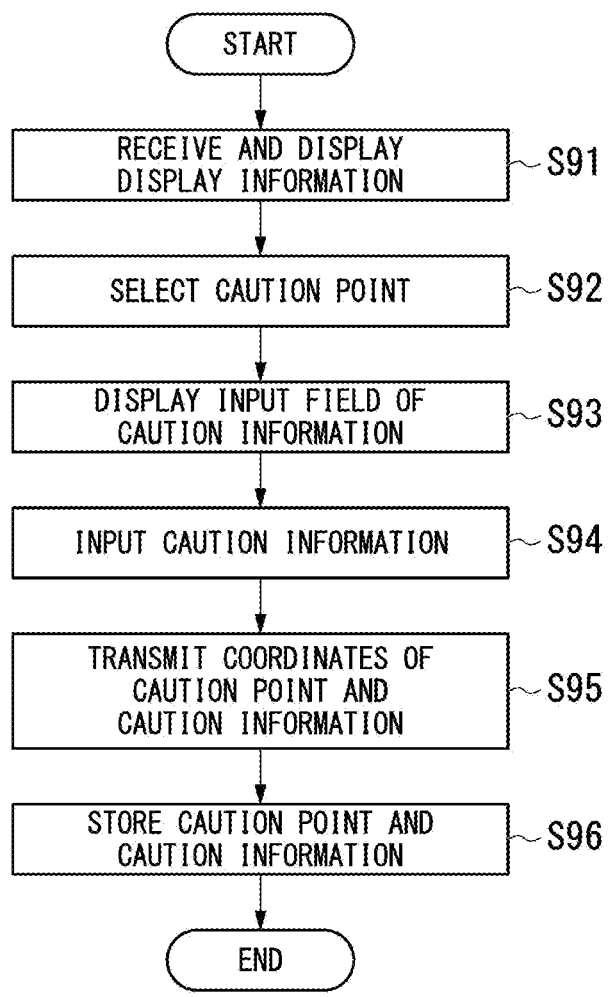
FIG. 11 is a flowchart showing a method of registering caution information in the first embodiment.

FIG. 11 is a flowchart showing a method of registering caution information in the first embodiment.

The in-vehicle terminal V203 receives and displays a display image from the information presenting device 120 (step S91). The display image displayed at this time may not include the host vehicle plot P2 indicating the current position as shown in FIG. 6, or may include the host vehicle plot P2 indicating the current position as shown in FIGS. 7 to 9.

The operator operates the in-vehicle terminal V203 and selects a point where an event requiring the operator's caution, such as mud, frozen, or a falling object, has occurred from the display image (step S92). At this time, the operator may select the caution point as a point by touching one point on the display image or select the caution point as a surface by tracing the outline of the range where the caution point exists in the display image.

Next, the in-vehicle terminal V203 displays an input field of the caution information (step S93). The operator inputs a character string indicating caution information in the input field (step S94). Then, the in-vehicle terminal V203 transmits the input coordinates of the caution point and the caution information to the information presenting device 120 (step S95).

The caution information acquisition unit 1105 of the information presenting device 120 stores the coordinates of the caution point and the caution information in the caution information storage unit 1203 in association with each other, when the coordinates of the caution point and the caution information are received from the in-vehicle terminal V203 (step S96).

Thus, the operator can notify the information presenting device 120 of information on a point requiring caution at the construction site. The information presenting device 120 can notify the operator of the loading vehicle V2 present in the vicinity of the caution point of the caution information notified by one operator.

<<Action and Effect>>

As described above, according to the first embodiment, the information presenting device 120 specifies a position of each of a plurality of vehicles based on images captured by a plurality of imaging devices 110 installed at a construction site, receives the designation of the loading vehicle V2 from among the plurality of vehicles, and displays in an overlapping manner, on the in-vehicle terminal V203 of the loading vehicle V2, the proximity plot P3 representing the position of the transport vehicle V1 whose distance from the loading vehicle V2 is less than a threshold on the overhead image of the construction site.

Thus, the information presenting device 120 can make the operator of the loading vehicle V2 recognize the presence of the nearby transport vehicle V1 easily.

The information presenting device 120 generates an overhead image, based on images captured by the plurality of imaging devices 110. Thus, it is possible to prevent a blind spot from occurring in the overhead image.

Further, according to the first embodiment, the information presenting device 120 displays in an overlapping manner, on the in-vehicle terminal V203 of the loading vehicle V2, the normal plot P1 representing the position of the transport vehicle V1 whose distance from the loading vehicle V2 is equal to or greater than a threshold in addition to the proximity plot P3 on the overhead image of the construction site. At this time, the information presenting device 120 emphasizes the nearby transport vehicle V1 over the other transport vehicles V1 by displaying the normal plot P1 and the proximity plot P3 in different modes. Thus, the information presenting device 120 can notify the operator of the loading vehicle V2 whether or not the transport vehicle V1 exists in the vicinity while recognizing the positions of the plurality of transport vehicles V1. On the other hand, in other embodiments, the information presenting device 120 may not display the normal plot P1 representing the transport vehicle V1 that is away from the loading vehicle V2.

Further, according to the first embodiment, the information presenting device 120 receives the designation of the loading vehicle V2 by inputting the coordinates of the overhead image. Thus, the information presenting device 120 can receive the designation of the loading vehicle V2 regardless of the presence or absence of a position specifying function such as Global Navigation Satellite System (GNSS). On the other hand, in other embodiments, the information presenting device 120 may receive the designation of the loading vehicle V2 by acquiring position information specified by GNSS or the like from the loading vehicle V2.

Further, according to the first embodiment, the information presenting device 120 specifies the position of the designated vehicle in a new image based on the comparison between the new image in the time series of the images captured by the plurality of imaging devices 110 and the previous image (tracks the designated vehicle). Thus, the information presenting device 120 can specify the position of the loading vehicle V2 without receiving the designation again, even in a case where the loading vehicle V2 moves after receiving the designation of the loading vehicle V2.

In particular, the information presenting device 120 receives the designation by inputting coordinates of the overhead image, and thereafter, tracks the vehicle based on the time series of the image, thereby displaying the position of the loading vehicle V2 on the in-vehicle terminal V203 of the loading vehicle V2 having no position specifying function.

On the other hand, in other embodiments, the information presenting device 120 may update the position of the designated loading vehicle V2, by always acquiring position information specified by GNSS or the like from the loading vehicle V2. In other embodiments, the information presenting device 120 may receive the designation of the loading vehicle V2 from the operator every time the loading vehicle V2 moves.

Further, according to the first embodiment, the information presenting device 120 displays in an overlapping manner the figure P4 representing the caution point whose distance from the loading vehicle V2 is less than a threshold on the overhead image of a construction site, on the in-vehicle terminal V203 of the loading vehicle V2. Thus, the information presenting device 120 can make the operator of the loading vehicle V2 recognize the presence of a point requiring caution in the vicinity. On the other hand, in other embodiments, the information presenting device 120 may not present the caution information to the loading vehicle V2.

Other Embodiments

As described above, although an embodiment has been described in detail with reference to drawings, a concrete configuration is not limited to the above description, and various design changes or the like are possible.

For example, the construction site management system 1 according to the above-described embodiment displays the overhead image with the plot attached thereto on the in-vehicle terminal V203 included in the loading vehicle V2, but the present invention is not limited thereto. For example, in the construction site management system 1 according to other embodiments, an overhead image with a plot attached thereto may be displayed not only on the in-vehicle terminal V203 included in the loading vehicle V2 but also on a terminal owned by the operator of the transport vehicle V1. In this case, the operator of the transport vehicle V1 can recognize other transport vehicles V1, loading vehicles V2, and caution points present in the vicinity.

Further, the information presenting device 120 according to the above-described embodiment displays the position of the transport vehicle V1 on the in-vehicle terminal V203 included in the loading vehicle V2, but the present invention is not limited thereto. For example, the information presenting device 120 according to another embodiment may display the position of another loading vehicle V2 on the in-vehicle terminal V203 included in the loading vehicle V2. In this case, the information presenting device 120 may highlight the position of the loading vehicle V2 in the vicinity of the designated vehicle.

Further, the construction site management system 1 according to the embodiment described above specifies the vehicle to be emphasized by the information presenting device 120, by the user selecting the plot displayed on the in-vehicle terminal V203, but the present invention is not limited thereto. For example, the construction site management system 1 according to another embodiment may specify a vehicle to be emphasized based on position information specified by the GNSS mounted on the loading vehicle V2 or may specify a vehicle to be emphasized, by recognizing a unique identification mark attached to the loading vehicle V2 from the image captured by the imaging device 110.

In addition, the construction site management system 1 according to the above-described embodiments generates an overhead image and recognition of a vehicle by the information presenting device 120 provided in the construction site G, but the present invention is not limited thereto. For example, in the construction site management system 1 according to other embodiments, each in-vehicle terminal V203 of each loading vehicle V2 may function as the information presenting device 120. In this case, the in-vehicle terminal V203 can display the proximity plot P3 as follows, for example. The in-vehicle terminal V203 of each loading vehicle V2 can receive images captured by the plurality of imaging devices 110, generate an overhead image of the construction site G based on the plurality of received images, and specify the position of the vehicle. That is, in the present embodiment, the in-vehicle terminal V203 specifies the positions of the plurality of vehicles, based on the images captured by the plurality of imaging devices 110. The in-vehicle terminal V203 specifies the designated vehicle (the loading vehicle V2 including the in-vehicle terminal V203) based on the image of the imaging device 110 or the survey result of GNSS. Then, the in-vehicle terminal V203 displays on the screen, the proximity plot P3 indicating the position of another vehicle that is close to the loading vehicle V2. That is, in other embodiments, the information presenting device 120 is not necessarily implemented as a server, and may be implemented by, for example, a plurality of in-vehicle terminals V203 that perform communication to each other.

INDUSTRIAL APPLICABILITY

The information presenting device according to the present invention can make the operator of a vehicle easily recognize other vehicles present in the vicinity.

REFERENCE SIGNS LIST 1 construction site management system
110 imaging device
120 information presenting device
1101 image acquisition unit
1102 overhead image generation unit
1103 vehicle recognition unit
1104 vehicle tracking unit
1105 caution information acquisition unit
1106 vehicle designating unit
1107 distance calculation unit
1108 display image generation unit
1109 display determination unit
1110 display control unit
1111 load specifying unit
1112 route presentation unit
1113 route learning unit
1201 image storage unit
1202 vehicle storage unit
1203 caution information storage unit
V1 transport vehicle
V2 loading vehicle
V203 in-vehicle terminal

The invention claimed is:
1. An information presenting device comprising:
a processor and a storage storing a program,
wherein the processor is configured to execute the program programmed to
specify a position of each of a plurality of vehicles based on images captured by a plurality of imaging devices installed at a construction site;
receive designation of a designated vehicle, among the plurality of specified vehicles; and
output a signal for displaying in an overlapping manner a proximity plot and a normal plot, the proximity plot representing a position of another vehicle whose distance from the designated vehicle is less than a threshold on an overhead image of the construction site, the normal plot representing a position of another vehicle whose distance from the designated vehicle is equal to or greater than a threshold and having a different form from the proximity plot on the overhead image.
2. The information presenting device according to claim 1,
wherein the processor is configured to execute the program further programmed to
specify a position of the designated vehicle, in a time series of images captured by the plurality of imaging devices, and
output the signal based on the specified position of the designated vehicle.
3. The information presenting device according to claim 1,
wherein the processor is configured to execute the program further programmed to receive the designation of the designated vehicle by inputting coordinates of the overhead image.
4. The information presenting device according to claim 1,
wherein the processor is configured to execute the program further programmed to
store caution points at the construction site, and
output a signal for displaying in an overlapping manner a figure representing a caution point whose distance from the designated vehicle is less than a threshold on the overhead image of the construction site.

5. An information presenting method comprising the steps of:
specifying, by a processor, a position of each of a plurality of vehicles based on images captured by a plurality of imaging devices installed at a construction site;
receiving, by the processor, designation of a designated vehicle, among the plurality of specified vehicles; and
displaying, by the processor, in an overlapping manner, on a display device, a proximity plot and a normal plot, the proximity plot representing a position of another vehicle whose distance from the designated vehicle is less than a threshold on an overhead image of the construction site, the normal plot representing a position of another vehicle whose distance from the designated vehicle is equal to or greater than a threshold and having a different form from the proximity plot on the overhead image.

6. The information presenting device according to claim 2,
wherein the processor is configured to execute the program further programmed to receive the designation of the designated vehicle by inputting coordinates of the overhead image.

7. The information presenting device according to claim 2,
wherein the processor is configured to execute the program further programmed to
store caution points at the construction site, and
output a signal for displaying in an overlapping manner a figure representing a caution point whose distance from the designated vehicle is less than a threshold on the overhead image of the construction site.

8. The information presenting device according to claim 3,
wherein the processor is configured to execute the program further programmed to
store caution points at the construction site, and
output a signal for displaying in an overlapping manner a figure representing a caution point whose distance from the designated vehicle is less than a threshold on the overhead image of the construction site.

9. The information presenting device according to claim 6,
wherein the processor is configured to execute the program further programmed to
store caution points at the construction site, and
output a signal for displaying in an overlapping manner a figure representing a caution point whose distance from the designated vehicle is less than a threshold on the overhead image of the construction site.

\* \* \* \* \*